Dec. 29, 1931.  F. R. SIMMS ET AL  1,838,117
DUST SEPARATOR
Filed Dec. 5, 1928
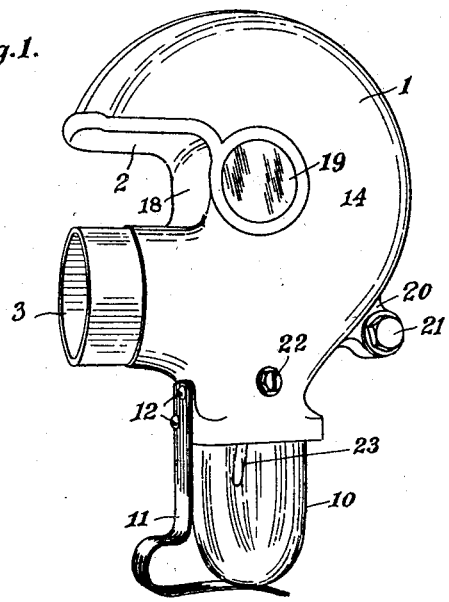
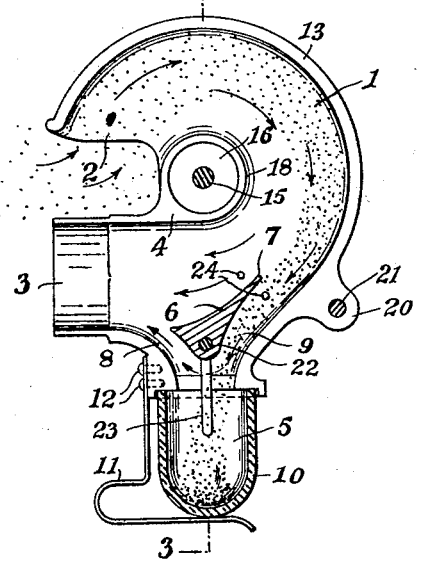
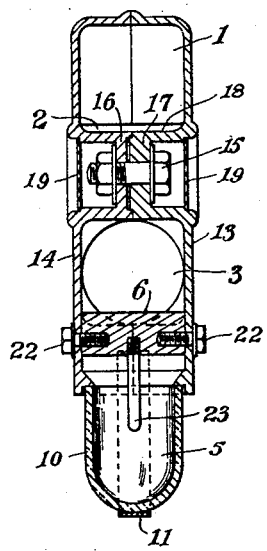
Inventors:
Frederick Richard Simms and
Bertram Charles Joy
By Louis Precoost Whitaker
Atty.

Patented Dec. 29, 1931

1,838,117

UNITED STATES PATENT OFFICE

FREDERICK RICHARD SIMMS AND BERTRAM CHARLES JOY, OF LONDON, ENGLAND

DUST SEPARATOR

Application filed December 5, 1928, Serial No. 324,014, and in Great Britain July 19, 1928.

This invention relates to devices employed in connection with the carburetters of internal combustion engines whereby the air drawn into the carburetter is filtered.

According to the invention there is provided a chamber adapted to be connected to the air inlet of a carburetter so shaped as to impart a circular or substantially circular motion to the entering air stream for the purpose of centrifugally separating the dust from the air.

Further, the invention comprises a chamber, as set forth in the preceding paragraph, wherein means are provided for separating the entering air stream into dust-laden air and dust free air and deflecting the dust laden air stream into a dust collecting chamber.

In order that the invention may be fully understood reference will be made to the accompanying drawings wherein:—

Figure 1 is a perspective view of a dust filtering device constructed in accordance with the invention.

Figure 2 is a sectional view of the apparatus with one half removed, and

Figure 3 is a section on the lines 3—3 of Figure 2.

Referring to the drawings 1 represents the main chamber of the device which is formed as an annular chamber of tubular form conveniently of rectangular cross-section. The air-inlet 2 of the chamber is divided from the air-outlet 3 by a radial web or wall 4, so that the air on its passage round the chamber from the inlet to the outlet 3 moves in a substantially circular path in one plane. The dust content of the air is thereby projected by contrifugal action towards the outer wall of the chamber in the form of a film of dust of gradually decreasing thickness as indicated diagrammatically in Figure 2. In order to trap the thin stream or film thus formed and prevent the same continuing with the main stream to the outlet there is formed in the outer wall of the chamber and adjacent to the outlet 3 a dust collecting chamber 5 into which the dust film is deflected. The chamber 5 is arranged to merge into the main chamber and at the entrance thereof is provided with a deflector 6, the leading edge 7 of which is arranged at a point at which separation of the dust and air streams takes place, so that the main dust-free air continues in its circular path whilst the dust-laden air moves in a direction substantially tangential to the said path at the point where the edge 7 of the deflector 6 meets the main air stream. The deflector is arranged to extend between the sides of the main chamber and the dust collecting chamber so as to provide a pair of transverse channels 8 and 9 on either side of the deflector which communicate with the chamber 5. The inner face of the deflector conforms to the curvature of the inner face of the said main chamber as shown in Figure 2 of the drawings and is preferably so shaped that the under surface thereof conforms to the curvature of the walls of the channels leading to the chamber 5. The main stream of dust-free air passes over the deflector to the outlet and thence to a carburetter across the opening of the channel 8 and thereby creates a suction effect in the said channel which carries away dust-free air from the chamber 5 and at the same time serves to draw the dust-laden air or film through the channel 9. It will be obvious also that air may be caused to flow into the chamber 5 through the passage 9 by a restriction of the main passage at or near the edge 7 of the deflector 6. The sharp change in the direction of flow in the chamber 5 of the dust-laden stream has the effect of depositing the dust particles contained therein in or on the walls of the said chamber.

The chamber 5 or the lower portion thereof advantageously comprises a bowl of glass 10 so that the dust content may be readily observed. The bowl is arranged to be held in position by means of a flat spring 11, secured by screws 12 to the main chamber 1 in such a manner that the said bowl may be easily removed for cleansing purposes.

The main chamber is preferably constructed of two metal stampings or die-castings 13 and 14 held together by a bolt 15 which extends through inter-engaging bosses 16 and 17, which form the core 18 of the main chamber. The aforesaid bosses may be recessed as shown in the drawings and closed by discs 19. In addition, the periphery of the device may be formed with coacting lugs 20 secured together by a bolt 21. This bolt prevents relative movement of the two halves 13 and 14, and also serves for the attachment of a support bracket where one is employed.

The deflector 6 is preferably formed of a shaped block of aluminium pivotally secured between the sides 13 and 14 of the main chamber by screws 22—22 and is provided with a dependent arm 23 whereby the said deflector 6 may be adjusted within the range of the pins 24 between which the edge 7 of the deflector moves. The deflector may, however, be formed integrally with the main stampings or die-castings 13 and 14 or it may be a separate fixed element.

The chamber 5 is advantageously coated interiorly with a film of oil or other viscous liquid so that the entering dust is thereby retained. The bottom of the chamber 5 may also contain a quantity of oil or other suitable liquid upon the surface of which the dust settles, subsequently sinking to the bottom. Such liquid will probably be shaken into contact with, or will coat by capillary attraction the sides of the said chamber 5 and thus maintain the chamber in an efficient dust-catching condition.

It will be appreciated that the dust laden stream of air is caused to proceed in such a manner that the direction is abruptly changed whereby the dust, due to inertia, is deposited on the bottom of the chamber, the dust freed air passing out therefrom and rejoining the main stream passing into the carburetter.

It has been found in practice that the apparatus as above described has a silencing effect on air passing to a carburetter. Furthermore, by making the detachable subsidiary chamber of glass the separated dust is visible and the cleansing effect of the filter can be readily gauged. The chamber can be removed and emptied and replaced while the engine is running.

It will also be appreciated that the device lends itself to economical production by die-casting or press tool work.

The object of the adjustable deflector is to enable the dust filter to be used in connection with engines of various sizes, more or less of the air drawn into the apparatus being deflected into the chamber 5.

Claims:

1. A device adapted to be connected with the air inlet of a carburetter for removing the dust of the entering air which comprises in combination a main chamber of substantially annular tubular form having an inlet for the dust laden air and an outlet for the dust free air, said inlet and outlet being arranged in the same plane, and also arranged so that a circular motion is imparted to the entering air whereby the same is divided into dust-laden and dust-free streams, a dust collecting chamber arranged in communication with the main chamber, and means for separating the said streams, so that the dust-laden stream is diverted into the said dust collecting chamber, and the dust free stream is directed to the said outlet said dust collecting chamber having an outlet to the dust-free streams.

2. A device adapted to be connected with the air inlet of a carburetter for removing the dust of the entering air which comprises in combination a main chamber having an inlet arranged to receive a dust laden stream, means for dividing the entering air into two separate streams one comprising a dust laden and the other a dust free stream, and an adjustable deflector for separating the said streams whereby the dust content of the entering air is deposited in a dust collecting chamber and the dust free air is delivered to an outlet in the main chamber, said dust collecting chamber having an outlet into the dust-free stream.

3. A device adapted to be connected with the air inlet of a carburetter for removing the dust of the entering air which comprises in combination a main chamber of substantially annular tubular form constructed of two sections each having a substantially annular groove of approximately U-cross section, an inlet for the dust laden air and an outlet for the dust free air, a detachable dust collecting transparent chamber containing a viscose liquid, arranged in communication with said main chamber so as to receive and retain the dust content of the entering air which is caused to pass through the said main chamber with a circular motion whereby the same is divided into dust laden and dust free streams, and an adjustable deflector arranged in the path of the dust laden and dust free streams and adjacent to the said outlet, whereby the dust laden stream is deflected into the said dust collecting chamber and the dust free air is permitted to pass to the said outlet.

FREDERICK RICHARD SIMMS.
BERTRAM CHARLES JOY.